US010616648B2

United States Patent
Shaw et al.

(10) Patent No.: US 10,616,648 B2
(45) Date of Patent: Apr. 7, 2020

(54) CROWD BASED CONTENT DELIVERY

(71) Applicant: PIKSEL, INC., Wilmington, DE (US)

(72) Inventors: Philip Antony Shaw, York (GB); Ralf Wilhelm Tillmann, Mannheim (DE); Andrew David Gayter, Bourne End (GB)

(73) Assignee: PIKSEL, INC., Wilmington, DE (US)

( * ) Notice: Subject to any disclaimer, the term of this patent is extended or adjusted under 35 U.S.C. 154(b) by 0 days.

(21) Appl. No.: 15/119,108

(22) PCT Filed: Feb. 13, 2015

(86) PCT No.: PCT/EP2015/053157
§ 371 (c)(1),
(2) Date: Aug. 15, 2016

(87) PCT Pub. No.: WO2015/121449
PCT Pub. Date: Aug. 20, 2015

(65) Prior Publication Data
US 2017/0134807 A1 May 11, 2017

(30) Foreign Application Priority Data

Feb. 13, 2014 (GB) .................................... 1402534

(51) Int. Cl.
*H04N 21/466* (2011.01)
*H04N 21/45* (2011.01)
(Continued)

(52) U.S. Cl.
CPC ..... *H04N 21/4661* (2013.01); *H04N 21/4223* (2013.01); *H04N 21/42201* (2013.01);
(Continued)

(58) Field of Classification Search
None
See application file for complete search history.

(56) References Cited

U.S. PATENT DOCUMENTS 9,071,875 B2 * 6/2015 Chow .............. H04N 21/25841
2007/0067794 A1 * 3/2007 Russell ................. H04W 24/00
725/25
(Continued)

FOREIGN PATENT DOCUMENTS

WO 2009/067670 A1 5/2009

OTHER PUBLICATIONS

International Search Report and Written Opinion, dated Feb. 13, 2015, EPO.

*Primary Examiner* — Fernando Alcon
(74) *Attorney, Agent, or Firm* — Holzer Patel Drennan

(57) ABSTRACT

A computer implemented method of controlling delivery of content to one or more media consuming devices associated with a group of consumers, the method comprising: receiving identification information of each consumer of the group of consumers; identifying each consumer of the group of consumers based on the received identification information; querying a data store to determine characteristics of each of said identified consumers; and controlling the delivery of the content to at least one of said one or more media consuming devices based on the determined characteristics of at least one consumer of the group of consumers, wherein each consumer in the group has an association link with all other consumers in the group, and wherein the content which is delivered is delivered to all consumers in the group.

20 Claims, 6 Drawing Sheets

(51) Int. Cl.
*H04N 21/4223* (2011.01)
*H04N 21/422* (2011.01)
*H04N 21/462* (2011.01)
*H04N 21/488* (2011.01)
*H04N 21/81* (2011.01)

(52) U.S. Cl.
CPC ..... *H04N 21/4532* (2013.01); *H04N 21/4622* (2013.01); *H04N 21/4667* (2013.01); *H04N 21/4884* (2013.01); *H04N 21/8106* (2013.01)

(56) References Cited

U.S. PATENT DOCUMENTS

| | | | |
|---|---|---|---|
| 2007/0136752 A1* | 6/2007 | Sanders | H04N 5/44543 725/46 |
| 2007/0244880 A1* | 10/2007 | Martin | G06F 17/30038 |
| 2010/0251305 A1* | 9/2010 | Kimble | H04N 7/17318 725/46 |
| 2011/0295843 A1* | 12/2011 | Ingrassia, Jr. | G06F 17/30053 707/723 |
| 2012/0063649 A1 | 3/2012 | Petit | |
| 2014/0006550 A1 | 1/2014 | Cain | |
| 2014/0040932 A1* | 2/2014 | Gates, III | H04N 21/251 725/14 |
| 2014/0053196 A1* | 2/2014 | Selim | H04N 5/44 725/41 |
| 2015/0007221 A1* | 1/2015 | Bhogal | H04N 21/25883 725/34 |
| 2015/0019469 A1* | 1/2015 | Ioannidis | H04N 21/466 706/46 |
| 2015/0189348 A1* | 7/2015 | Wang | H04N 21/2665 725/51 |

* cited by examiner

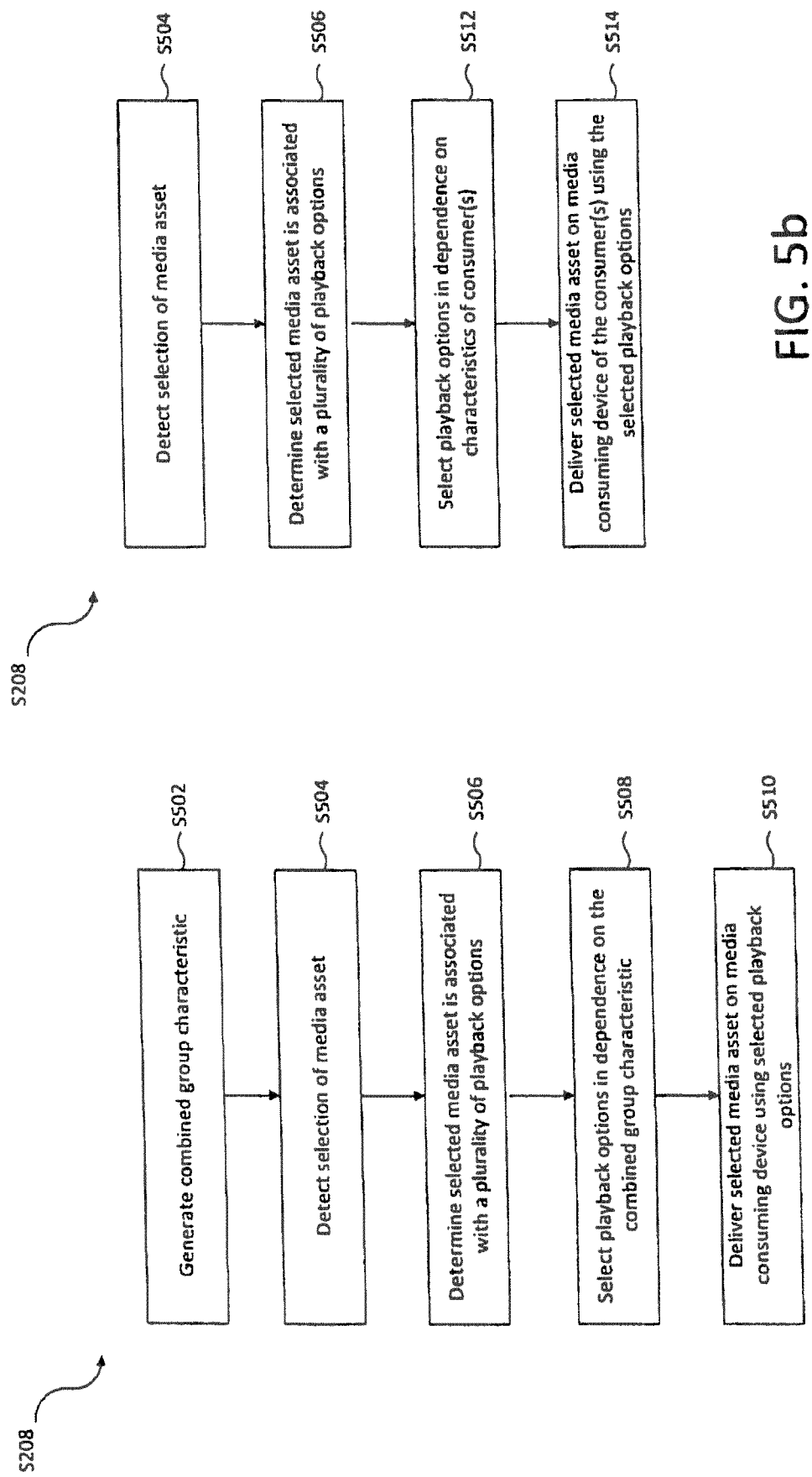

CROWD BASED CONTENT DELIVERY

TECHNICAL FIELD

The present invention relates to controlling delivery of content to a group of content consuming users.

BACKGROUND

There is an ever increasing amount of media content i.e. television channels, and "on-demand" content which can be selected and viewed by a consumer on a viewing device, such as a television.

After a media asset is selected to be consumed (i.e. watched, listened to, or read etc.) if the media asset is to be consumed by multiple consumers, these multiple consumers invariably have different requirements about how they wish to consume and enjoy the media. For example, many video content publishers often make different editions of a media asset available for different audiences (e.g. a G or U rated version and a PG version) or offer selectable playback options within a given rendition of a media asset (e.g. different language audio tracks).

Typically, consumers have to select playback options manually. Although, some playback options can be pre-configured for a particular consumer's playback device (e.g. a Blu-ray player can be set always to play the German language track).

SUMMARY

The inventors have recognised that with the catalogue of available media assets growing ever larger, and at an increasing rate, it can be difficult to navigate this wealth of data quickly to find something interesting or appropriate to watch. Whilst difficult for a single consumer, this problem is exacerbated with multiple consumers when attempting to find content that all of the multiple consumers would like to watch.

Furthermore, manual setting of playback options is often a time consuming process which often leads to appropriate playback options being incompletely set or not at all by the consumers of the media. As described above, whilst some playback options can be pre-configured for a particular consumer's playback device, this lacks the flexibility to take into account the preferences of other people with whom they are watching the media with.

These challenges are addressed by the present disclosure.

According to one aspect of the present disclosure there is provided a computer implemented method of controlling delivery of content to one or more media consuming devices associated with a group of consumers, the method comprising: receiving identification information of each consumer of the group of consumers; identifying each consumer of the group of consumers based on the received identification information; querying a data store to determine characteristics of each of said identified consumers; and controlling the delivery of the content to at least one of said one or more media consuming devices based on the determined characteristics of at least one consumer of the group of consumers, wherein each consumer in the group has an association link with all other consumers in the group, and wherein the content which is delivered is delivered to all consumers in the group.

The data store may be a data store accessible by a processor which determines the characteristics of each of said identified consumers, or it may be local to a media consuming device. In the latter case, a characteristic can be derived from consumer activity at the media consuming device. Characteristics can be derived from one or both of these types of data store. It will be appreciated that where characteristics are derived by consumer action or selection at a media consuming device, this may be a temporary data store, such as a cache, which receives that characteristic and renders it available to a network access interface accessible to the processor which determines the characteristics of the identified consumers.

Thus, the step of querying the data store can comprise querying multiple data stores at different locations (local to the processor or local to the media consuming device).

The method may further comprise processing the determine characteristics of each of said identified consumers to generate a combined group characteristic; and controlling the delivery of content to said one or more media consuming devices in dependence on the generated group characteristic.

The step of processing the determined characteristics can comprise filtering the determined characteristics using a filtering parameter associated with the consumers and generating a combined group characteristic from the filtered characteristics. Another type of processing can include taking "raw" characteristics and averaging them or smoothing them in some way before they are filtered or further processed to generate a combined group characteristics.

The method may further comprise: providing the combined group characteristic as an input to a recommendations engine; the recommendations engine determining one or more recommended media assets from a plurality of available media assets based on said combined group characteristic; and transmitting recommendation data to the said one or more media consuming devices to indicate the one or more recommended media assets to the group of consumers.

The recommendation data can be changed when the group changes. That is, the method can comprise receiving a change in the group of consumers and recommending new content based on the changed group. For example, a consumer may arrive in the group or leave from the group and this may cause the content or the playback options for that content to be altered.

According to one example, the initial group may include a foreign language speaker who has required subtitles as a playback option. When he leaves the group, subtitles are no longer needed and so the playback option is adapted accordingly.

In another example, a child may arrive in group previously composed of adults, and a version of the recommended media asset which is suitable for children can be recommended on the arrival of the child.

Thus, both the asset itself (or the version of the asset), and/or the playback option may be changed when the configuration of the group changes.

The recommendation data may further comprise information to control at least one screen of the one or more media consuming devices to visually display the one or more recommended media assets to the group of consumers.

The recommendation data may further comprise further information to control the at least one screen of the one or more media consuming devices to visually display the one or more recommended media assets as selectable inputs to the group of consumers.

The method may further comprise detecting selection of one of the one or more recommended media assets by a consumer of the group of consumers and controlling the at least one screen of the one or more media consuming devices to display the selected media asset.

The recommendation data may comprise information to control audio output means of the one or more media consuming devices to audibly indicate the one or more recommended media assets to the group of consumers.

The method may further comprise: detecting selection of a media asset stored in a memory by a consumer of the group of consumers; determining that the selected media asset is associated with a plurality of available playback options; selecting one or more of said playback options in dependence on the determined characteristics of at least one consumer of the group of consumers; and controlling the delivery of the selected media asset to at least one of said one or more media consuming devices based on the selected one or more playback options.

The group of consumers may be associated with a single media consuming device, the method further comprising: selecting one or more of said playback options in dependence on the combined group characteristic; and controlling the delivery of the selected media asset on the single media consuming device in dependence on the selected one or more playback options.

The group of consumers may be associated with a plurality of media consuming devices, and the at least one consumer of the group of consumers is associated with a media consuming device of said plurality of media consuming devices, the method comprising controlling the delivery of the selected media asset to the media consuming device associated with the at least one consumer based on the selected one or more playback options.

The plurality of available playback options may comprise a plurality of versions of the selected media asset, the method comprising selecting one of said versions of the selected media asset.

The plurality of available playback options may comprise audio tracks in a plurality of languages, the method comprising selecting one of said audio tracks.

The plurality of available playback options comprise subtitles in one or more languages, the method comprising selecting subtitles in one of said one or more languages.

The received identification information may comprise device identification information of at least one consumer of the group of consumers.

The received identification information may comprise biometric data of at least one consumer of the group of consumers.

The characteristics of an identified consumer may comprise one, or any combination of: the identified consumer's content viewing history; the identified consumer's content preferences; content previously watched by the identified consumer within a predetermined time frame; historical viewing trends of the identified consumer; and Demographic details of the identified consumer.

According to a further aspect of the present disclosure there is provided a computer program product for controlling an output of a viewing device visible to a group of consumers, the computer program product being embodied on a computer-readable medium and configured so as when executed on a processor to perform any of the methods described herein.

According to another aspect of the present disclosure there is provided a content delivery system for controlling delivery of content to one or more media consuming devices associated with a group of consumers, the content delivery system comprising: an identification module configured to identify each consumer of the group of consumers based on received identification information of each consumer; a characteristics determination module configured to determine characteristics of each of said identified consumers; and a viewing device control module configured to control at least one of said one or more media consuming devices based on the determined characteristics of at least one consumer of the group of consumers.

A data store can hold the characteristics. The characteristic determination module can have a memory access component which is configured to access the data store. Alternatively or additionally, a data store may be provided on the media consuming device itself, in which case the characteristic determination module has a network access component configured to access characteristics provided by the media consuming device. Characteristics provided by the media consuming device and characteristics which are held in a data store accessible to the characteristic determination module by way of a memory access component can be smoothed, averaged or combined to generate a combined group characteristic which controls delivery of the media content.

According to a further aspect of the present disclosure there is provided a computer implemented method of delivering media content using at least one media consuming device, the media content consumable by each of a group of consumers, the method comprising: receiving identification information of each consumer of the group of consumers; identifying each consumer of the group of consumers based on the received identification information; querying a data store to determine characteristics of each of said identified consumers; processing the determined characteristics of each of said identified consumers to generate a combined group characteristic; and delivering the media content to the at least one media consuming device in dependence on the generated group characteristic.

According to a further aspect of the present disclosure there is provided a computer implemented method of delivering a selected piece of media content to multiple media consuming devices associated with a group of consumers, each media consuming device associated with one or more consumers of said group of consumers, the method comprising: receiving identification information of each consumer of the group of consumers; identifying each consumer of the group of consumers based on the received identification information; querying a data store to determine characteristics of each of said identified consumers; determining that the selected media content is associated with a plurality of available playback options; and for each media consuming device of the media consuming devices, selecting one or more of said playback options in dependence on the determined characteristics of the one or more consumer associated with the media consuming device, and delivering the media content to the media consuming device based on the one or more playback options selected for said media consuming device.

BRIEF DESCRIPTION OF THE DRAWINGS

For a better understanding of the present disclosure and to show how the same may be put into effect, reference will now be made, by way of example, to the following drawings in which:

FIG. 5a is a flow chart for a process of delivering content to consumers in the first environment according to a second embodiment; and FIG. 5b is a flow chart for a process of delivering content to consumers in the second environment according to a second embodiment.

DETAILED DESCRIPTION

Figure 1A:
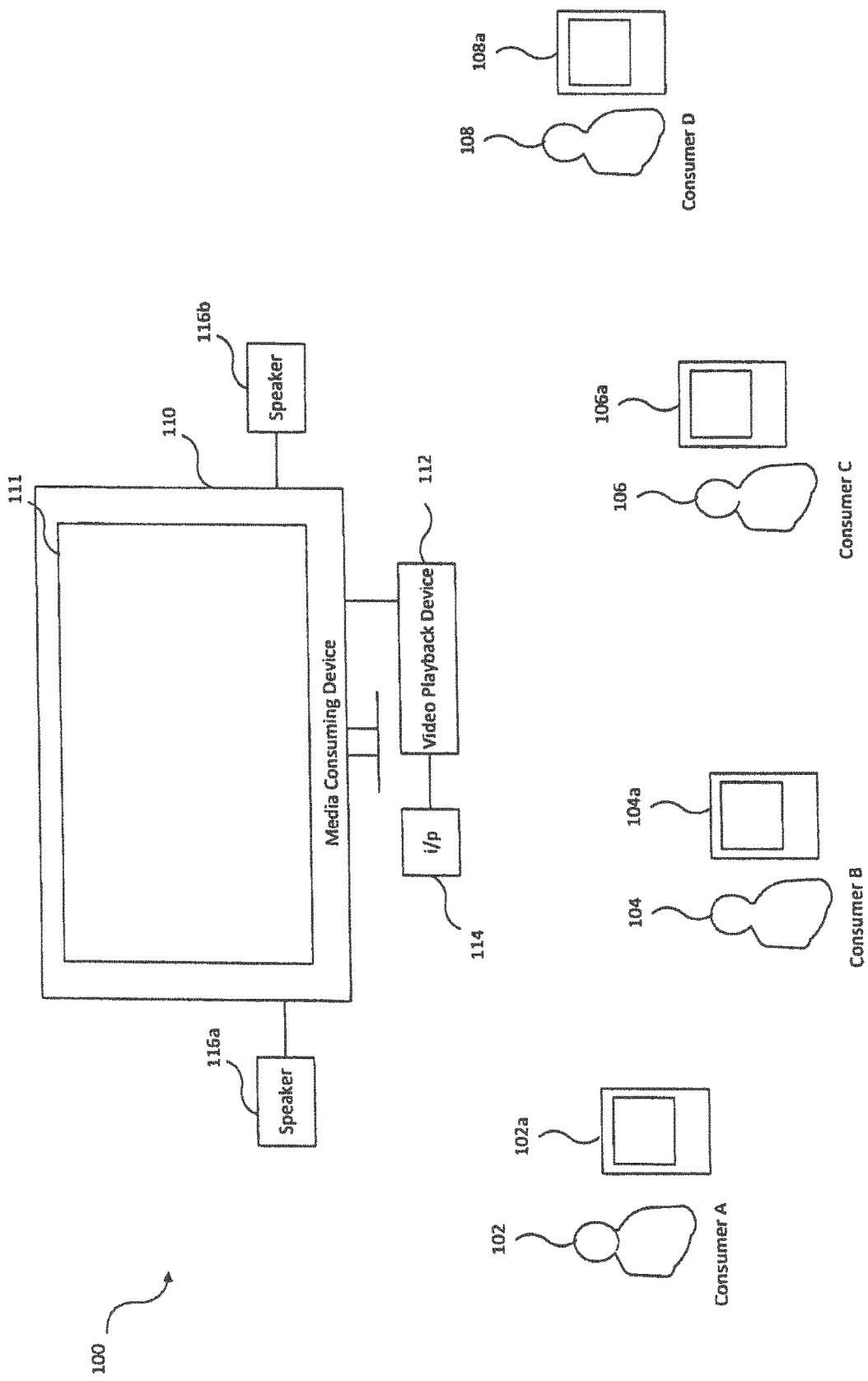
FIG. 1a illustrates a first environment of a viewing device.
Figure 1B:
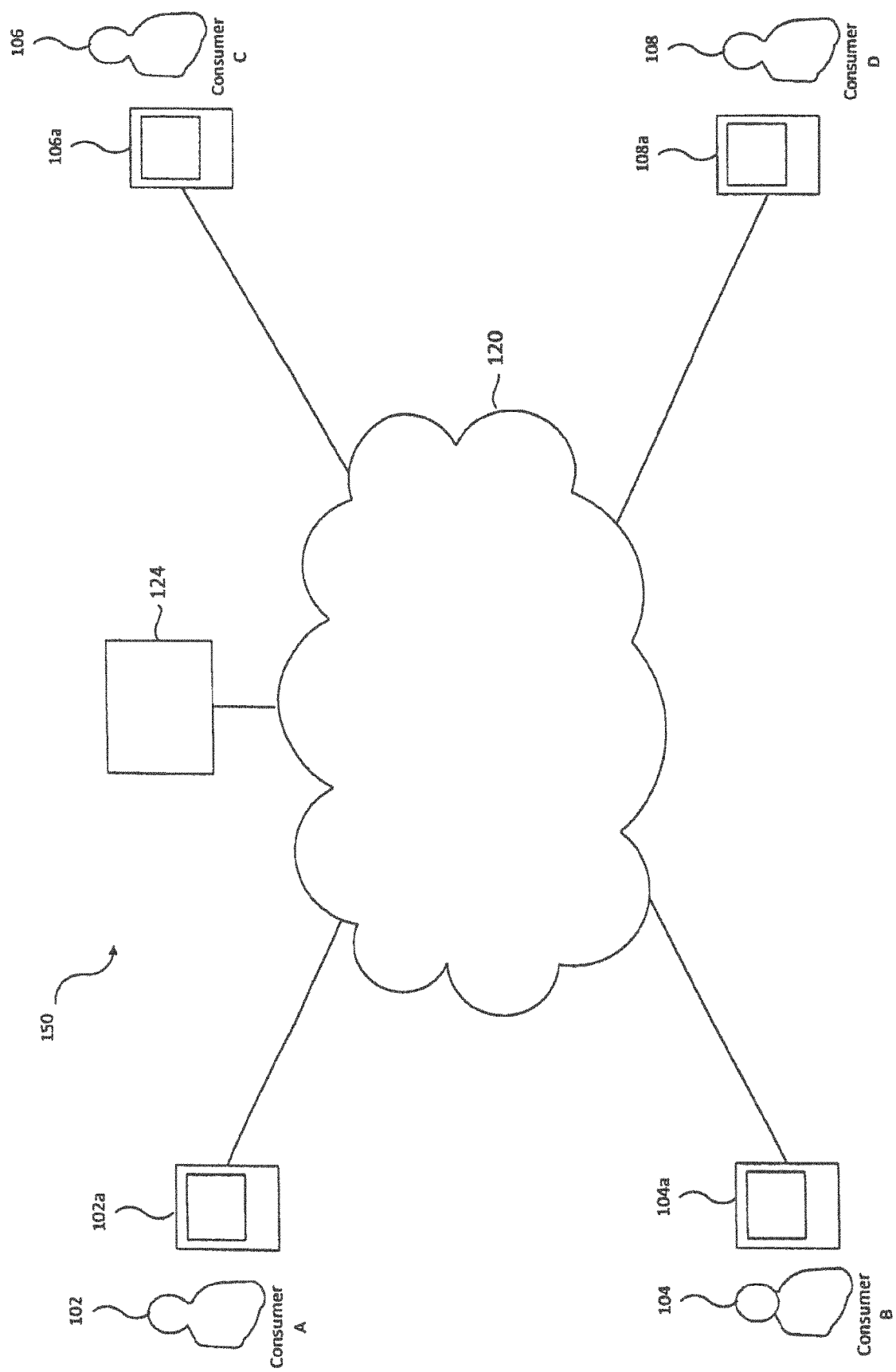
FIG. 1b illustrates a second environment comprising multiple viewing devices.

FIG. 1a illustrates a "local" environment 100 comprising a media consuming device 110 such as a television with a screen 111. The media consuming device 110 is coupled to a video playback device 112 which is configured to display media content on an output means (the screen 111) of the media consuming device 110. The video playback device 112 may comprise for example a set top box, a digital media player, or a video disc player etc. The video playback device 112 is coupled to input means 114. The input means 114 is configured to receive data used by the video playback device 112 to identify consumers in the environment 100. Whilst FIG. 1 shows the video playback device 112 and the input means 114 as external to the media consuming device 110, it will be appreciated that the functionality of one or more of the video playback device 112 and the input means 114 may be incorporated into the media consuming device 110.

The media consuming device 110 may be coupled to output means (one or more speakers 116) for outputting audio signals. The one or more speakers 116 may be external to the media consuming device 110 and coupled to the media consuming device 110 using a suitable interface (as shown in FIG. 1). Alternatively, the one or more speakers 116 may be integrated into the media consuming device 110.

As shown in FIG. 1, a group of content consuming users (otherwise referred to as content consumers) may be present in the environment 100 and want to watch or otherwise consume media content delivered using the media consuming device 110. FIG. 1 shows a first consumer 102 (content consumer A), a second consumer 104 (content consumer B), a third consumer 106 (content consumer C), and a fourth consumer 108 (content consumer D). Whilst four content consumers are shown as being present in the environment 100, this number of content consumers in the group of consumers is merely an example.

The environment 100 is referred to as being a "local" environment in the sense that the group of consumers are present in the same physical location such that content delivered using media consuming device 100 is consumable to the group of consumers.

One or more content consumers in the group may be associated with a user device. For example content consumer A 102 may be associated with a first user device 102a, content consumer B 104 may be associated with a second user device 104a, consumer C 106 may be associated with a third user device 106c, and content consumer D 108 may be associated with a fourth user device 108a. The user devices may be, for example, a mobile phone, a personal digital assistant ("PDA"), a personal computer ("PC"), a tablet computer, a gaming device or other embedded device able to communicate with the input means 114.

As is well known in the art, one of the content consumers in the local environment 100 may select content to view on the media consuming device 110 by navigating content options displayed on the screen 111 and by making an appropriate selection using an input device (not shown in FIG. 1). The input device may be a remote control, keyboard, remote control, a camera or infra-red depth sensor able to detect gesture commands or any other input device well known to persons skilled in the art. The screen 111 may be a touch-screen, in which case consumer selections may be received via the touch screen.

Embodiments of the present disclosure are not limited to a group of consumers in a local environment consuming content on a single media consuming device. That is, embodiments of the present disclosure also extend to a virtual environment 150 (for example any social or other artificial platform) shown in FIG. 1b.

In the virtual environment 150, multiple media consuming devices are coupled to a computer network 120 via a wireless or wired connection. In this environment, the consumers use their associated user device to consume media. Each media consuming device may be used to watch content by one or more consumers. The computer network 120 may be any suitable network which has the ability to provide a communication channel between the viewing devices and a content server 124. The computer network 120 may be a packet-based network such as the Internet or a High data rate mobile network, such as a $3^{rd}$ generation ("3G") mobile network, or may be a non-packet-based network in other embodiments. Whilst four consuming devices are shown as being present in the virtual environment 150, this number of consuming devices is merely an example.

The environment 100 is referred to as being a "virtual" environment in the sense that a social or other artificial platform enables a media asset to be consumed at multiple media consuming devices at the same time by the group of consumers on their associated media consuming device. The group of consumers may be in the same physical location or in separate physical locations.

Figure 2:
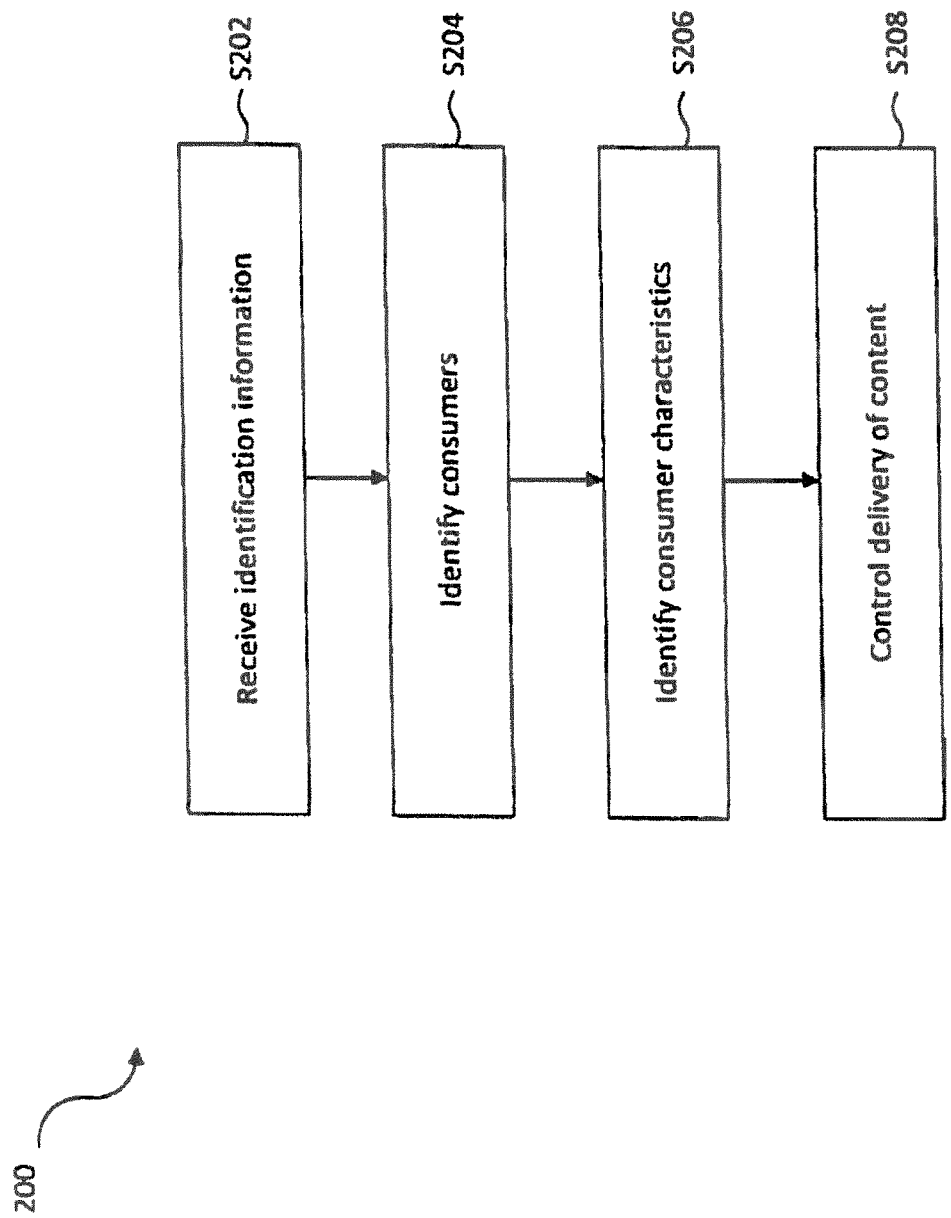
FIG. 2 is a flow chart for a process of delivering content to consumers.
Figure 3:
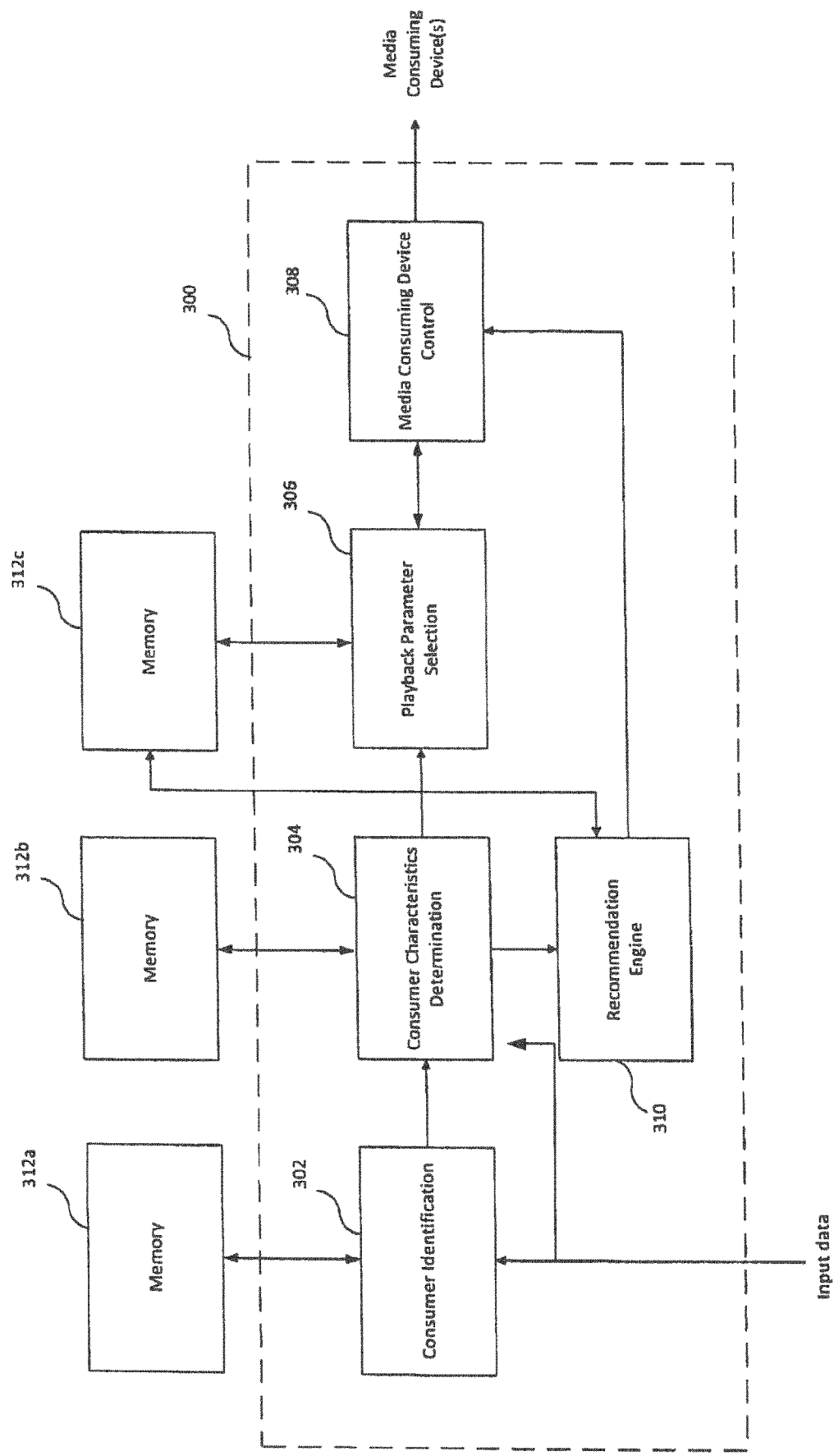
FIG. 3 shows a schematic view of a content delivery system.

Reference is now made to FIGS. 2 and 3 which illustrate how content is delivered to a group of content consuming users (102, 104, 106, 108) that is tailored to those consumers.

FIG. 2 illustrates a process 200 performed by a content delivery system 300 in accordance with embodiments of the present disclosure.

In the local environment 100, the content delivery system 300 is implemented on the video playback device 112. As described above, the functionality of the video playback device 112 may be implemented by the media consuming device 110. In the virtual environment, the content delivery system 300 is implemented on the content server 124.

The process 200 starts at step S202 where a consumer identification module 302 of the content delivery system 300 receives identification information of each consumer of the group of consumers.

In the local environment 100, the input means 114 is configured to receive the identification information of each of the consumers in the environment 100 and supply the identification information to the consumer identification module 302 of the content delivery system 300

In the virtual environment 150, the consumer identification module 302 is configured to receive the identification information of each of the consumers in the environment 150 from the multiple media consuming devices over the computer network 120 using respective communication channels.

The process 200 then proceeds to step S204, at step S204 a consumer identification module 302 of the content delivery system 300 identifies each of the consumers of the group of consumers in the environment (local or virtual). The consumer identification module 302 performs step S204 by receiving the consumer identification information and comparing this received data to known consumer information stored in a memory 312a coupled to the consumer identification module 302.

The known consumer information may be collected as part of a registration process which a consumer carries out. The registration process collects data associated with a consumer (for example device information of a device associated with a consumer and/or biometric information of the consumer) and associates this collected data with an identity (for example a consumer name or profile). As part of the registration process a consumer may link their identity with a social media account associated with the consumer and/or a Video On Demand (VOD) account associated with the consumer. Following the registration process a consumer becomes a "known" consumer.

The identification information of a consumer received at the consumer identification module 302 may comprise device identification information (for example a string of alphabetic and/or numeric characters uniquely identifying a device) from a device associated with the consumer.

The memory 312a may store device identification information associated with known consumers and the consumer identification module 302 may determine that a known consumer is present in the environment (virtual or local) by comparing received device identification information with the stored device identification information associated with known consumers.

In the environment 100, the input means 114 may be a wireless receiver configured to receive the device identification information from user devices in the environment 100 according to a suitable wireless technology. Persons skilled in the art will be familiar with such wireless technologies such as Bluetooth and Bluetooth LE and therefore for reasons of clarity these are not discussed in detail herein. In the local environment 100, a consumer's associated user device may be present with the consumer in the environment 100, however it is the media consuming device 110 that is used to deliver content to the group of consumers.

In the virtual environment 150, the consumer identification module 302 may receive device identification information from a viewing device over the computer network 120 using an appropriate communication channel.

Whilst using device identification information is one possible method for identifying one or more consumers in an environment, embodiments of the present disclosure are not limited to this particular method. For example, in the environment 100 a consumer's associated device may not be present with the consumer and therefore device identification information may not be available.

The identification information of a consumer received at the consumer identification module 302 may comprise biometric information.

Memory 312a may store biometric information associated with known consumers and the consumer identification module 302 may determine that a known consumer is present in the environment (virtual or local) by comparing received biometric information with the stored biometric associated with known consumers.

By way of example only, and without limitation, the biometric information may comprise one or more of facial measurement data (e.g. distances between the eyes, nose and mouth of a consumer) body measurement characteristics, heartbeat, pulse, temperature, skin resistance, blood sugar levels, blood pressure, oxygen saturation levels, blink rate, voice signals, voice level and tone, and iris pattern data.

In the local environment 100 the input means 114 is configured to receive the biometric information. For example the input means 114 may be a microphone, camera, heartbeat sensor or other sensor.

In the virtual environment 150, the biometric data is captured at the media consuming devices and transmitted to the content delivery system on the content server 124. The sensor or sensing devices for capturing the biometric data may be, for example, stand-alone biometric sensor devices, or the sensors may be integrated into a consumers media consuming device (for example a camera or microphone), or may be sensors able to communicate with applications or "apps" for example running on such devices.

Another type of consumer characteristics which can be used to control delivery of the content can be derived from the media consuming device itself. Thus, in FIG. 3 a portion of the input data is shown as being supplied directly to the consumer characteristics determination module 304. This could comprise consumer actions or selections at the media consuming device, for example, the selection of subtitles might indicate that a particular language of the content is required and/or that subtitles themselves are required. This can be taken into account with other characteristics of other consumers in the group to control delivery of the content. Thus, the consumer characteristics determination module 304 has a memory access component which can access the memory 312b, and also has a network access component which enables it to receive characteristics from the media consuming device. It will readily be appreciated that FIG. 3 is highly schematic and does not show the details of these access components, although their implementation would be clear to a person skilled in the art.

Controlling the delivery of content need not be static. That is, if the configuration of the group of consumers alters by the leaving or arrival of a consumer, the system can dynamically change the recommendation of the media asset, version of the media asset or playback option of the media asset. For example, if a group comprised a foreign language speaker and a media asset had subtitles, when the foreign language speaker leaves the group, this can be detected such that the content no longer needs a playback option with subtitles.

In another possible use case, a child might join a group which consisted only of adults before, the adults watching a version of content which is unsuitable for children. The arrival of the child can be detected and a U-rated version of the asset can be recommended in place of the PG version or adult version.

In embodiments in which the content delivery system 300 is implemented on the video playback device 112, the video playback device 112 may store the known consumer information locally (i.e. the memory 312a may be a component of the video playback device 112). Alternatively, the memory 312a may be located externally to the video playback device 112. For example the memory 312a may be a component of one or more storage devices (e.g. servers) in a computer network (e.g. the Internet) coupled to the video playback device 112.

In embodiments in which the content delivery system 300 is implemented on the content server 124. The memory 312a may be a component of the content server 124, and/or may a component of one or more other storage devices (e.g. servers) in the computer network 120.

Once the consumer identification module 302 has identified the plurality of consumers at step S204, the process 200 proceeds to step S206. At step S206, a consumer characteristics determination module 304 determines characteristics of the identified consumers in the environment.

The consumer characteristics determination module 304 performs step S206 by receiving the identities of the consumers from the consumer identification module 302, and comparing the consumer identities to known consumer identities to retrieve consumer characteristics associated with the known consumers. The known consumer identities and their associated consumer characteristics are stored in a memory 312b coupled to the consumer characteristics determination module 304. The consumer characteristics associated with a known consumer may be collected (i) during the initial registration process; and/or (ii) pulled from a social media account associated with the consumer and/or a Video On Demand (VOD) account associated with the consumer; and/or (iii) through the consumer's viewing activity of media assets stored in a memory 312c.

The consumer characteristics associated with a known consumer may comprise the consumer's content viewing history (when the consumer watched the content alone and/or with one or more other consumers), the consumer's content preferences (for example the consumer's favourite TV show(s), favourite genre(s) of video content etc.), the content previously watched by the consumer within a predetermined time frame (i.e. the consumer's recently watched content), the consumer's wish list (i.e. content selected for future viewing by the consumer), historical viewing trends of the consumer, and/or demographic details of the consumer such as age, gender, language, ethnicity, geographical location, and disabilities (for example whether the consumer is hard of hearing).

In embodiments in which the content delivery system 300 is implemented on the video playback device 112, the video playback device 112 may maintain the known consumer characteristics locally (i.e. the memory 312b may be a component of the video playback device 112). More typically, the memory 312b may be located externally to the video playback device 112. For example the memory 312b may be a component of one or more storage devices (e.g. servers) in a computer network (e.g. the Internet) coupled to the video playback device 112. In the latter case, the consumer characteristics stored in memory 312b may be characteristics obtained from a social media account associated with the consumer and/or a Video On Demand (VOD) account associated with the consumer.

In embodiments in which the content delivery system 300 is implemented on the content server 124. The memory 312b may be a component of the content server 124, and/or may a component of one or more other storage devices (e.g. servers) in the computer network 120. As above, in these embodiments consumer characteristics stored in memory 312b may be characteristics obtained from a social media account associated with the consumer and/or a Video On Demand (VOD) account associated with the consumer.

When the video content delivery system 300 detects a consumer for whom a social media or VOD account connection is not known, an onscreen prompt displayed on screen 111 of the media consuming device 110 (in the local environment 100) or on a display of a media consuming device associated with the consumer (in the virtual environment 150) by the content delivery system 300 can permit this link to be created to enable characteristics obtained from the social media account associated with the consumer and/or the Video On Demand (VOD) account associated with the consumer stored in the memory 312b to be associated with the identity of the consumer and therefore accessed by the consumer characteristics determination module 304.

Once the consumer characteristics module 304 has determined characteristics of each of the identified consumers in the environment (virtual or local) at step S206, the process 200 proceeds to step S208 where the content delivery system 300 control the delivery of content to the group of consumers.

Figure 4:
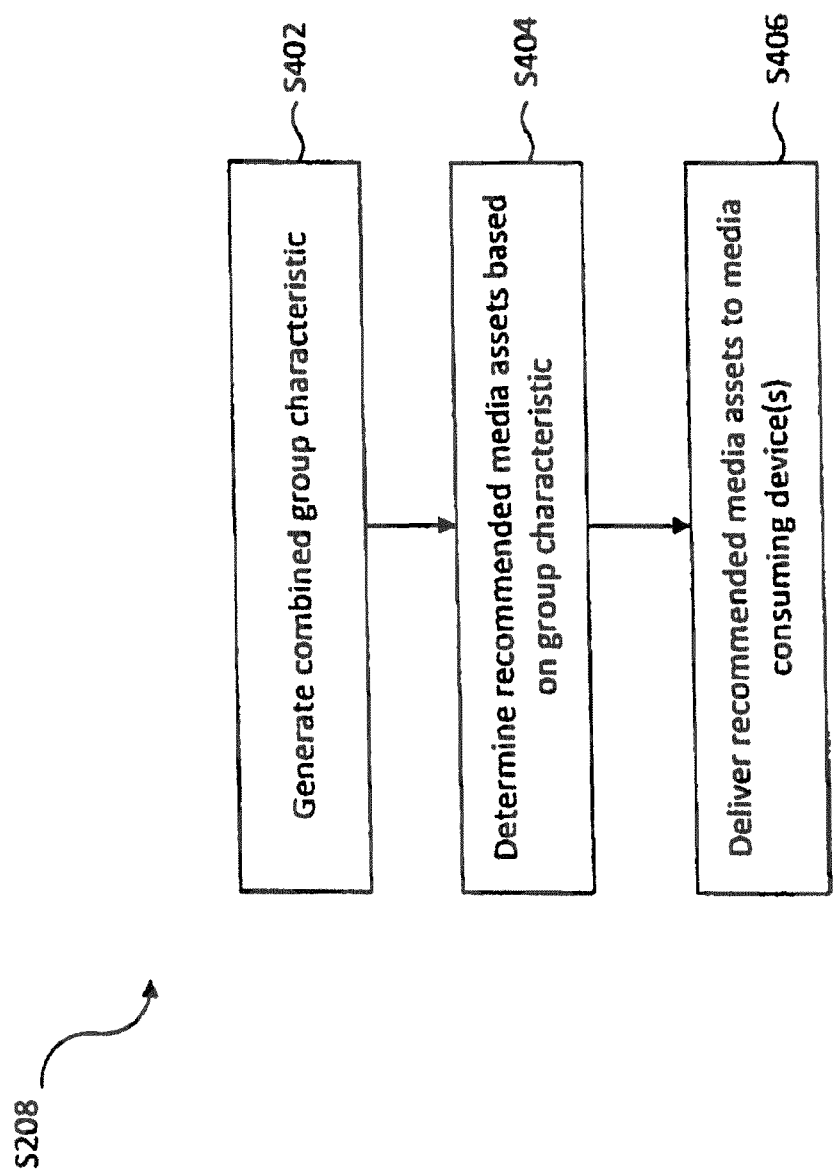
FIG. 4 is a flow chart for a process of delivering content to consumers in the first and second environments according to a first embodiment.

In one embodiment, at step S208 the content delivery system 300 is configured to deliver recommended media asset options to the group of consumers. This is described in more detail with reference to the steps shown in FIG. 4.

At step S402, the consumer characteristics module 304 is configured to process the determined characteristics of each of the identified consumers in the environment (local or virtual) to generate a combined group characteristic. The combined group characteristic defines the group of consumers' collective needs/desires for a viewing experience using the media consuming device 110 (in the local environment 100) or using the multiple media consuming devices (in the virtual environment 150).

In this embodiment, the consumer characteristics module 304 supplies the generated combined group characteristic to a recommendation engine 310.

The recommendation engine 310 has access to a catalogue of available media assets (media content) stored in a memory 312c. The catalogue of available media assets comprises a plurality of media assets. A media asset may be video content, for example, an episode of a television show, a movie, or a sports event (e.g. football match) etc. At step S404, the recommendation engine 310 is configured to determine a sub-set of the available media assets suitable for the group of consumers in the environment using the group characteristic. The recommendation engine 310 transmits recommendation data (indicating the recommended subset of available video assets) to a media consuming control module 308.

If the content delivery system 300 is implemented on the video playback device 112, the video playback device 112 may store the catalogue of media assets locally (i.e. the memory 312c may be a component of the video playback device 112). Alternatively or additionally, the memory 312c may be located externally to the video playback device 112. That is, the memory 312c may be a component of one or more storage devices (e.g. servers) in a computer network (e.g. the Internet) coupled to the video playback device 112.

If the content delivery system 300 is implemented on the content server 124. The memory 312c may be a component of the content server 124, and/or may a component of one or more other storage devices (e.g. servers) in the computer network 120.

The catalogue of media assets may include recently broadcast content provided by a broadcaster of that content as part of a catch-up service, and historic or original (i.e. non-broadcast) content provided by a service provider as part of other on-demand services. The catalogue of media assets may also include media assets to be broadcast live from a video content provider from the memory 312c to the content delivery system 300 over a suitable communication medium (i.e. satellite, cable or an IP based connection).

At step S406 the media consuming control module 308 is configured to deliver the recommendation data to the media consuming device 110 (in the local environment 100) or the multiple media consuming devices (in the virtual environment 150) to output the recommendation data to provide media asset options to the group of consumers.

The recommendation data may comprise information to control the screen 111 of the media consuming device 110 (in the local environment 100) or the displays of the multiple media consuming devices (in the virtual environment 150)

to visually display the one or more recommended media assets to the group of consumers.

The recommendation data may additionally comprise further information to control the screen 111 of the media consuming device 110 (in the local environment 100) or the displays of the multiple media consuming devices (in the virtual environment 150) to visually display the one or more recommended media assets as selectable inputs to the group of consumers.

The content delivery system 300 is configured to detect selection of one of the one or more recommended media assets by a consumer of the group of consumers and control the screen 111 of the media consuming device 110 (in the local environment 100) or the displays of the multiple media consuming devices (in the virtual environment 150) to display the selected media asset to the group of consumers.

The recommendation data may comprise information to control audio output means of the media consuming device 110 (in the local environment 100) or of the multiple media consuming devices (in the virtual environment 150) to audibly indicate the one or more recommended media assets to the group of consumers.

In this embodiment, the group of consumers in the environment (local or virtual) are provided with content recommendations tailored specifically to the particular consumers of the group. This advantageously makes navigation of video content to find something that is of interest to all the consumers in the environment simpler and quicker. The identification of consumers in the environment happens automatically, consumer characteristics are pooled without any user interaction and the recommendations choices are determined and presented ready for browsing all without consumer involvement.

The consumer characteristics are not shared between consumers—rather they are pooled by the content delivery system 300 and used as a collective input (the group characteristic) to the recommendations engine 310. This maintains privacy of the respective consumers.

Different kinds of data may be pooled in different ways: content preferences, viewing history, playback options, rating limitations and so on. Examples of each type of common characteristic data are set out below.

The content preferences of a group can be calculated in a number of ways, but one approach can be considered in this way. Each user's preferences may be summarised as a collection of relative preferences for items of content grouped by genre, category, type, actor, theme and so on.

For instance: Sci-Fi=40; Westerns=−10; Film Noir=60; RomCom=−40; Humphrey Bogart=80; etc . . . .

Positive values indicate a preference; negative values describe a dislike. How these values for each user are calculated is beyond the scope of this application, but they might, for example, be derived from a summation of everything they've ever watched and rated.

For the group as a whole, therefore, the content preference might be the average of their combined preferences.

Viewing history is treated in a subtly different way. A "smoothing" takes place on the recommended assets themselves. Supposing the content preferences calculated above are submitted to a recommendation engine and a list of possible results are returned. Items from each consumer's viewing history that have been watched all the way through by a majority of the group are excluded from the list.

Items watched partially are left in the list as are items watched completely by members of the group in the distant past.

This logic removes shows that are popular but which users may not wish to watch again so soon after watching them previously, but to allow old favourites to remain. Likewise, items that users have watched and liked but haven't completed are retained.

Playback options are treated differently again. Options here include audio tracks, subtitles and so on.

Audio track selection is based on that option which meets the needs of the largest number of users present since only one audio track can play at once.

However, it may be practical to show more than one set of subtitles at once. Subtitle options are chosen based on the stated needs of the group, plus any audience members excluded by the audio track selection. For example: three people are watching a movie, two English speakers and one French. The audio track selected by the system would be English but French subtitles would be shown even though the French viewer had not selected any subtitle preference.

These option choices are monitored throughout playback as users come and go.

Finally, rating limitations and other content properties that might exclude users are applied in a wholly exclusive way. If an audience comprises a group of thirty-something's and a 7 year old, then the recommendation engine results are limited by the needs of the most restrictive member of the audience, in this case the 7 year old. The consumer characteristics associated with a known consumer stored in memory 312b are updated by the content delivery system 300 based on what consumers watch alone, and with other consumers so that future recommendations may take advantage of viewing trends experienced by particular groupings of consumers. For example the consumer characteristics associated with consumer A 102 may indicate that consumer A 102 typically watches media assets from a first content pool when viewing with consumer B 104, but when consumer C 106 is also present, consumer A 102 typically watches media assets from a second content pool when viewing with consumer B 104 and consumer C 106.

A media asset in the catalogue of available media assets (media content) stored in a memory 312c has default playback options, and may also be associated with other additional available playback options. That is the media asset may be able to be delivered using an output of a viewing device in a number of ways.

In another embodiment with reference to the local environment 100, at step S208 the content delivery system 300 is configured to deliver a selected media asset using the media consuming device 110 using playback options tailored to the group of consumers. This is described in more detail with reference to the steps shown in FIG. 5a.

At step S502, the consumer characteristics module 304 generates the combined group characteristic as described above. In this embodiment, the consumer characteristics module 304 supplies the generated group characteristic to a playback parameter selection module 306.

At step S504, the playback parameter selection module 306 detects selection of a media asset by one of the group of consumers in the environment 100.

At step S506, the playback parameter selection module 306 accesses the memory 312c where the selected media asset is stored and determines that the selected media asset is associated with other additional available playback options.

The selected media asset may be an asset from a catalogue of available media assets. Furthermore the selected media asset may have been recommended to the group of consumers in accordance with the embodiment described above.

The selected media asset may alternatively not be an asset from a catalogue of available media assets. That is, the selected media asset may be the only media asset in memory 312c, for example if a removable storage medium (for example optical media such as a DVD and other variants thereof, i.e. a CD) that is arranged to be inserted into the video playback device 112 comprises the memory 312c storing the selected media asset.

At step S508, selects the default playback options or one or more of the other additional available playback options in dependence on the group characteristic.

The playback parameter selection module 306 is coupled to the memory 312c and is configured to provide the selected media asset to the media consuming device control module 308 with the selected playback options.

In this embodiment, at step S510 the media consuming device control module 308 is configured to control an output of the media consuming device 110 in dependence on the selected one or more playback options.

The other additional available playback options may include different versions of the media asset, each of the different versions of the media asset suitable for different ages of audience. For example, the default version of the selected media asset may be a PG version of the media asset, and a U rated version of the media asset may also be available. The playback parameter selection module 306 is configured to select a version of the media asset in dependent on the group characteristic, and at step S510, the viewing device control module 308 is configured to control the screen 111 of the media consuming device 110 to display the selected version of the media asset. Thus, parents watching a programme with their children are shown a family-friendly version of the media asset. Similarly, a child selecting content alone would only get a suitable version offered.

The other additional available playback options may include different audio tracks that are to be output using the speakers 116 during delivery of the media asset on the screen 111 of the media consuming device 110, each of the different audio tracks providing audio in different languages. For example the default audio track may be in English and audio tracks in other languages (e.g. French, German etc.) may also be available. The playback parameter selection module 306 is configured to select an appropriate audio track in dependent on the group characteristic, and at step S510, the viewing device control module 308 is configured to control the speakers 116 of the media consuming device 110 to output the selected audio track. Thus, a group of consumers who share a common language would have the audio track for the common language selected automatically.

The other additional available playback options may include subtitles to display on the screen 111 of the media consuming device 110 during delivery of the media asset on the screen 111 of the media consuming device 110, the subtitles may also be provided in different languages (e.g. English, French, German, etc.). If subtitles are required, the playback parameter selection module 306 is configured to select appropriate subtitles dependent on the group characteristic, and at step S510, the viewing device control module 308 is configured to control the screen 111 of the media consuming device 110 to display the selected subtitles. Thus if the group of consumers comprise a consumer who requires foreign language subtitles, these foreign language subtitles would be automatically overlaid on top of the displayed media asset. Similarly, if the group of consumers comprise a hard-of-hearing consumer, appropriate subtitles would be automatically overlaid on top of the displayed media asset.

The content delivery system 300 is configured to continually identify the consumers in the environment 100. It will be appreciated that as the consumers present in the environment 100 changes, the group characteristic generated by the consumer characteristics determination module 304 also changes. This enables the content delivery system 300 to continually adapt the experience to best suit the current audience of the media consuming device 110.

For example, English language speaking consumer A 102 and consumer B 104 may be watching a selected media asset displayed on the screen 111 of the video playback device 112 with an English language audio track being output from the speakers 116. French speaking consumer C 106 may join consumer A 102 and consumer B and in accordance with the embodiment described above, the content delivery system 300 controls the screen 111 to display French subtitles overlaying the media asset. The French speaking consumer C 106 may then leave consumer A 102 and consumer B and in accordance with the embodiment described above, the content delivery system 300 controls the screen 111 to removes the French subtitles overlaying the media asset. A child consumer D 108 may then join consumer A 102 and consumer B 104 and a PG scene may pause or skip due to the presence of consumer D 108 in the environment 100. If all of the consumers leave the environment 100 then the playback of the media asset may pause. It will be appreciated that these are merely examples to explain the dynamic nature of the playback options selection.

It will be appreciated from the above that the consumers in the environment 100 are provided with a media asset with appropriate playback options that suit all consumers watching the media asset. This advantageously avoids the need for manual setting of playback options, which as alluded to earlier, is often a time consuming process and often leads to appropriate playback options being incompletely set or not at all by the consumers of the media.

In another embodiment with reference to the local environment 150, at step S208 the content delivery system 300 is configured to deliver a selected media asset to each media consuming device using playback options tailored to the one or more consumers consuming the media asset at the respective media consuming device. This is described in more detail with reference to the steps shown in FIG. 5a.

In this embodiment, once the playback parameter selection module 306 determines that the selected media asset is associated with other additional available playback options, at step S512 for each media consuming device of the multiple media consuming devices the playback parameter selection module 306 selects playback options in dependence on the characteristics of the one or more consumers associated with the respective media consuming device and provide the selected media asset to the media consuming device control module 308 with the selected playback options.

In this embodiment, at step S514 the media consuming device control module 308 is configured to deliver the selected media asset to each media consuming device with the playback options selected to be suitable for the one or more consumers associated with the respective media consuming device.

This enables for example a group of consumers with different native languages to consume the same selected media asset on their respective devices but are provided with the audio track appropriate to their language. That is, in accordance with this embodiment, one or more consumers at a media consuming device are provided with a selected media asset with appropriate playback options that suit the one or more consumers at that media consuming device.

In embodiments described above with reference to the local environment 100, it will be appreciated from the description of the input means 114 provided above that the input means 114 has a limited range at which it can detect consumers. The inventors have recognised that video content watched as a group typically occurs within a trusted environment: at home, with friends and so on. Whilst in other contexts the limited range of the input means 114 may be a disadvantage, the limited range of the input means 114 is advantageous in the context of the present disclosure as only those consumers present in the same location (i.e. in the environment 100) will have their consumer characteristics contributing to the group characteristic which is provided as an input to the recommendation engine 310 and/or the playback parameter selection module 306.

In the embodiments described above, each consumer in the group has an association link with all other consumers in the group. That is, the group of consumers in the group are associated with each other in that they want to consume media together, whether on a single media consuming device or multiple media consuming devices.

While reference has been made above to media assets being video content, the media assets may also be audio content (for example a radio show, podcast, audio book), or text-based content.

Whilst memory 312a, 312b and 312c have been shown in FIG. 3 as separate memories, in embodiments one or more of the memory 312a, 312b and 312c may be portions of the same memory.

Any of the functionality described herein can be implemented using software, firmware, hardware (e.g., fixed logic circuitry), or a combination of these implementations. The terms "module", "functionality", and "component" as used herein generally represent software, firmware, hardware, or a combination thereof. In the case of a software implementation, the module or functionality represents program code that performs specified tasks when executed on a processor (not shown in the Figures). The program code can be stored in one or more computer readable memory devices.

It will be appreciated that the above embodiments have been described only by way of example, and other variants or applications may be apparent to a person skilled in the art given the disclosure herein.

The present invention is not limited by the described examples but only by the appendant claims. Any reference signs in the claims should not be construed as limiting the scope.

The invention claimed is:

1. A computer implemented method of delivering media content using a plurality of media consuming devices, each media consuming device being associated with at least one consumer, the method comprising:
   receiving identification information of each consumer associated with the plurality of media consuming devices;
   querying a data store to determine characteristics of each of said identified consumers;
   processing the determined characteristics of each of said identified consumers to generate a combined group characteristic;
   determining a set of recommendations for the identified consumers in dependence on the combined group characteristic;
   transmitting the set of recommendations to each of the plurality of media consuming devices to display to the identified consumers;
   detecting selection of a media asset stored in a memory by a consumer of the group of consumers;
   preparing to transmit the selected media asset to each of the plurality of media consuming devices, such that each media consuming device is to receive the same media asset;
   determining whether the selected media asset is associated with a plurality of available stored versions and a plurality of available stored playback options;
   selecting, in dependence of the determination, one of the stored versions or one of the stored playback options for each media consuming device, in dependence on characteristics of one or more consumers associated with the respective media consuming device;
   transmitting the selected media asset to all of the media consuming devices in accordance with the combined group characteristic in a stored version and/or the selected stored playback option of the media consuming device to which it is to be delivered;
   in response to a change in the group of consumers:
      dynamically changing the combined group characteristic; and,
      dynamically changing: the stored version of the selected media asset to a new version; or the stored playback option of the selected media asset to a new stored playback option for one or more media consuming devices; and
   transmitting the new stored version, and/or the new stored playback option to the one or more media consuming devices.

2. The computer implemented method of claim 1, wherein the step of querying the data store comprises querying multiple data stores at different locations.

3. The computer implemented method of claim 1, wherein the data store is located at the media consuming device.

4. The computer implemented method of claim 1, wherein processing the determined characteristics comprises filtering the determined characteristics using a filtering parameter associated with the consumers and generating the combined group characteristic from the filtered characteristics.

5. The computer implemented method of claim 1, wherein the step of processing the determined characteristics comprises calculating an average of content preferences of consumers in the group.

6. The computer implemented method of claim 1, further comprising:
   providing the combined group characteristic as an input to a recommendations engine;
   the recommendations engine determining one or more recommended media assets from a plurality of available media assets based on said combined group characteristic; and
   transmitting recommendation data to the said one or more media consuming devices to indicate the one or more recommended media assets to the group of consumers.

7. The computer implemented method according to claim 6, comprising the step of identifying from the one or more recommended media assets a one or more asset which has been viewed by a majority of consumers in the group up to a certain period of time in the past.

8. The computer implemented method of claim 6, wherein the recommendation data comprises further information to control the at least one screen of the one or more media consuming devices to visually display the one or more recommended media assets as selectable inputs to the group of consumers, the method further comprising:
 detecting selection of one of the one or more recommended media assets by a consumer of the group of consumers and controlling the at least one screen of the one or more media consuming devices to display the selected media asset.

9. The computer implemented method of claim 6, wherein the recommendation data comprises information to control audio output from the one or more media consuming devices to audibly indicate the one or more recommended media assets to the group of consumers.

10. The computer implemented method of claim 1, wherein the group of consumers are associated with a single media consuming device, the method further comprising:
 delivering the selected media asset on the single media consuming device in dependence on the selected one or more playback options.

11. The computer implemented method of claim 1, wherein the plurality of available playback options comprise audio tracks in a plurality of languages, the method comprising selecting one of said audio tracks.

12. The computer implemented method of claim 1, wherein the plurality of available playback options comprise subtitles in one or more languages, the method comprising selecting subtitles in one of said one or more languages.

13. The computer implemented method according to claim 1, wherein the plurality of available playback options comprise audio tracks in a plurality of languages, the method comprising selecting one of the audio tracks wherein the audio track which is selected is the audio track in the language of a majority of the group of consumers.

14. The computer implemented method of claim 1, wherein the received identification information comprises at least one of: device identification information of at least one consumer of the group of consumers; and biometric data of at least one consumer of the group of consumers.

15. The computer implemented method of claim 1, wherein the characteristics of an identified consumer comprise one, or any combination of:
 the identified consumer's content viewing history;
 the identified consumer's content preferences;
 content previously watched by the identified consumer within a predetermined time frame;
 historical viewing trends of the identified consumer; and
 demographic details of the identified consumer.

16. The computer implemented method of claim 1, wherein the characteristics of an identified consumer are derived from consumer selection at the media consuming device.

17. A computer program product for delivery of media content to a plurality of media consuming devices, each media consuming device being associated with at least one consumer, the computer program product embodied on a non-transitory computer-readable medium and configured so as when executed on a processor to:
 receive identification information of each consumer associated with the plurality of media consuming devices;
 query a data store to determine characteristics of each of said identified consumers;
 process the determined characteristics of each of said identified consumers to generate a combined group characteristic;
 determine a set of recommendations for the identified consumers in dependence on the combined group characteristic;
 transmit the set of recommendations to each of the plurality of media consuming devices to display to the identified consumers;
 detect selection of a media asset stored in a memory by a consumer of the group of consumers;
 prepare to transmit the selected media asset to each of the plurality of media consuming devices, such that each media consuming device is to receive the same media asset;
 determine whether the selected media asset is associated with a plurality of available stored playback options and/or stored versions;
 select, in dependence of the determination, one of the stored playback options and/or stored versions for each media consuming device, in dependence on characteristics of one or more consumers associated with the respective media consuming device;
 transmit the selected media asset to all the media consuming devices in accordance with the combined group characteristic, in a stored playback option and/or stored version in accordance with the characteristic of the individual to the media consuming devices to which it is to be delivered;
 responsive to a change in the group of consumers;
  dynamically change the combined group characteristic; and,
  dynamically change one of: the stored version of the selected media asset to a new stored version, or the stored playback option of the selected media asset to a new stored playback option for one or more individual media consuming devices;
 wherein if a new stored version or a new stored playback option is determined for an individual media consuming device, it is delivered to that media consuming device.

18. A content delivery system for delivery of media content to a plurality of one media consuming devices, each associated with at least one consumer, the content delivery system comprising:
 memory; and
 a processor configured to:
 receive identification information of each consumer associated with a plurality of media consuming devices;
 determine characteristics of each of said identified consumers;
 process the determined characteristics to generate a combined group characteristic;
 determine a set of recommendations for the identified consumers independence on the combined groups characteristic;
 transmit the set of recommendations to each of the plurality of media consuming devices to display to the identified consumers;
 detect selection of a media asset stored in the memory by a consumer of the group of consumers;
 prepare to transmit the selected media asset to each of the plurality of media consuming devices, such that each media consuming device is to receive the same media asset;
 determine whether the selected media asset is associated with a plurality of available stored versions and/or a plurality of available stored playback options;
 select, in dependence on that determination, one of the stored versions and/or the stored playback options for each media consuming device, in dependence on characteristics of one or more consumers associated with the respective media consuming device; and transmit the selected media asset to all of the media consuming device in accordance with the combined group characteristic, in a stored version and/or selected stored playback option in accordance with the characteristic of the individual media consuming devices to which it is to be delivered, and upon receiving a change in the group of consumers, dynamically changing the combined group characteristic and dynamically changing selection of: the stored version of the selected media asset to a new stored version of the selected media asset, or the stored playback option of the selected media asset to a new stored playback option of the selected media asset for one or more individual media consuming devices, and delivering the new stored version and/or the new stored playback option to the one or more media consuming devices.

19. The content delivery system of claim 18, wherein the processor is configured to access a memory of a data store holding the characteristics.

20. The content delivery system of claim 18, wherein the processor is configured to access, over a network, characteristics provided by the media consuming device.

* * * * *